Jan. 29, 1935.  A. L. FREEDLANDER  1,989,168
V-BELT
Filed July 13, 1931  2 Sheets-Sheet 1

INVENTOR
ABRAHAM L. FREEDLANDER
BY
ATTORNEYS

Jan. 29, 1935.  A. L. FREEDLANDER  1,989,168
V-BELT
Filed July 13, 1931  2 Sheets-Sheet 2
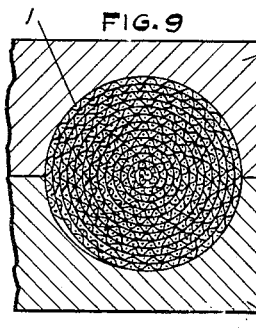
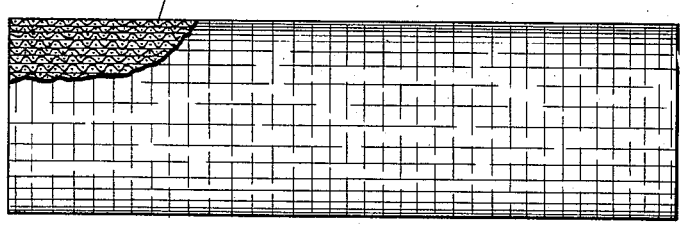
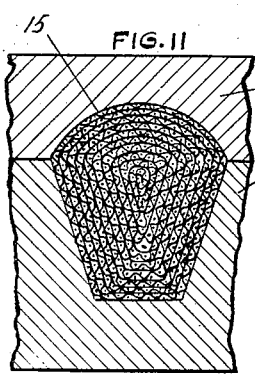
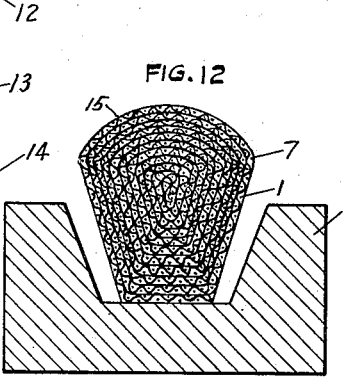
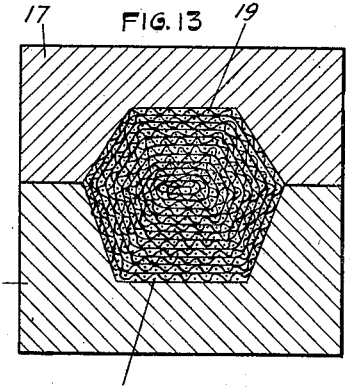
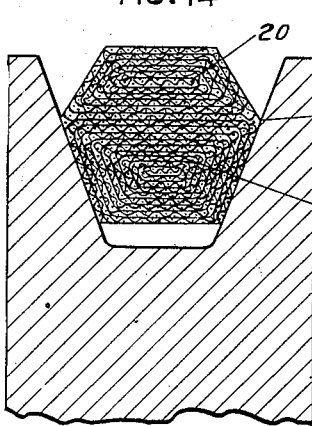
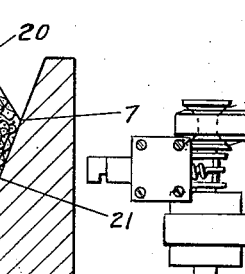
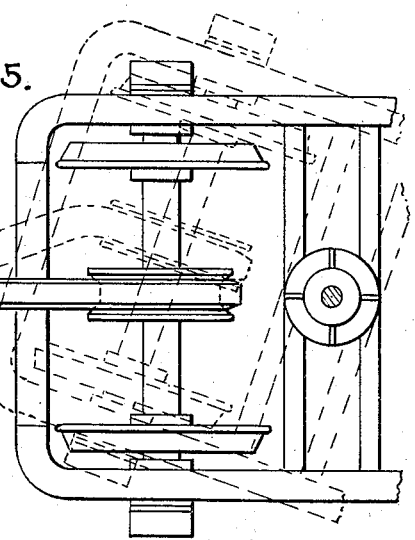
INVENTOR
ABRAHAM L. FREEDLANDER
BY
ATTORNEYS Patented Jan. 29, 1935

1,989,168

UNITED STATES PATENT OFFICE 1,989,168

V-BELT

Abraham L. Freedlander, Dayton, Ohio, assignor to The Dayton Rubber Manufacturing Company, Dayton, Ohio, a corporation of Ohio Application July 13, 1931, Serial No. 550,478

6 Claims. (Cl. 74—233)

My invention relates to belts and in particular to belts composed of a plurality of layers of concentrically wound sheets of rubberized or rubber impregnated fabric.

It is the object of my invention to provide a method of forming a belt so that resistance to flexing transversely will be inherent in the belt structure in accordance with the arrangement of the layers of the belt or resistance to bending may be likewise secured by arranging the layers of the belt material.

It is a further object to provide a method of forming a belt comprising rolling spirally a strip of rubber impregnated fabric, molding it by one or more operations so as to arrange the layers of fabric in planes to resist the flexing of the belt as desired without disturbing the flexing of the belt in other directions, and in some cases of forming teeth in the belt so arranged by severing portions of the belt so molded.

It is an additional object thereby to use cheap straight laid fabric and to quickly and economically produce a belt of the desired cross section.

One of the primary objects of my invention is to provide a structure that is so internally braced by the arrangement of the layers of fabric that the tendency of the belt to twist torsionally about its longitudinal axis and thereby roll over in the groove in the pulley will be prevented, particularly when there is a movement of one pulley on which the belt is mounted out of alignment with another pulley on which the belt is mounted as in the case of generator drives on railway cars where the generator is fixed beneath the car body and the truck is pivoted to the car body.

Referring to the drawings, Figure 1 is an end elevation of the spirally wound roll of rubberized fabric.

Figure 9 is a section through a circular mold and the belt to bring it to circular form in order to have it of uniform diameter.

Figure 10 is a side elevation of the belt as so formed.

Figure 11 is a section through a mold which imparts to the lower portion of the belt such a form that it will fit into a V-shaped pulley with the layers of belt material generally vertical while the upper portion of the belt has the layers generally horizontal, forming an arch-shaped brace against transverse compression.

Figure 12 shows the belt formed in Figure 11 in the mold prior to molding to impart to the belt a form in which the major portion of the layers will be horizontal, or at least a sufficient number to prevent undue transverse flexing and in particular to prevent rolling or twisting of the belt.

Figure 13 shows the mold and belt in section as molded.

Figure 14 is a section through a belt so molded comprised of two separate cylindrical bodies of spirally wound rubberized fabric.

Fig. 15 is a plan view showing my improved belt attached to a pulley having a fixed axis, and mounted on a pulley having a swivelling axis, such as when mounted on a car truck.

Figure 1:
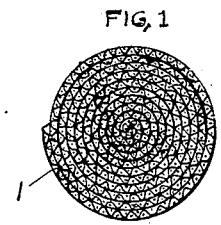
Figure 2:
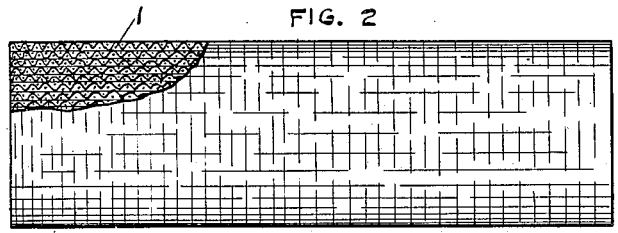
Figure 2 is a side elevation thereof.

Referring to the drawings in detail, 1 indicates a strip of straight laid woven textile material constituting a fabric which is impregnated with rubber. Its preferable condition is somewhat sticky or tacky so that when rolled spirally as in Figure 1 it will remain in that rolled condition, while at the same time will be sufficiently pliable to be molded into any desired cross section.

I have found that by arranging the layers of this spirally wound sausage-like raw stock in given planes by molding that I am enabled to control the resistance to forces applied to the belt, depending upon its application to a drive.

Figure 3:
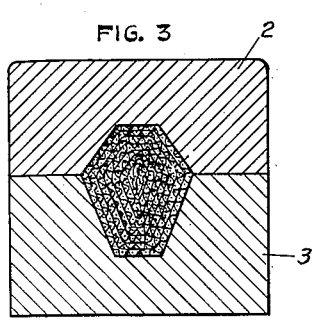
Figure 3 is a section through the mold showing the molding of the cylindrical raw stock roll 1 into the proper configuration desired with the arrangement of the layers of the fabric generally vertical to resist excessive bending.
Figure 5:
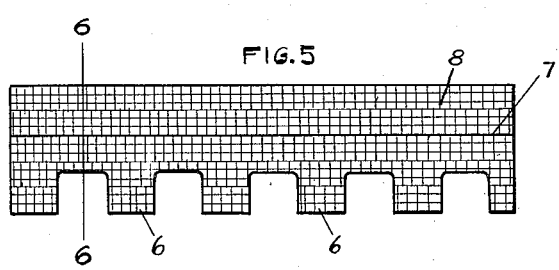
Figure 5 is a side elevation of the belt.
Figure 6:
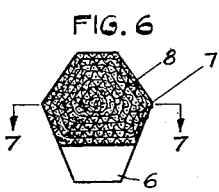
Figure 6 is a section on the line 6—6 of Figure 5.
Figure 7:
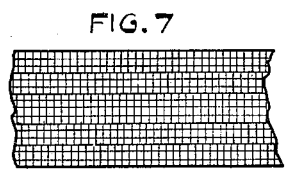
Figure 7 is a section on the line 7—7 of Figure 6.
Figure 4:
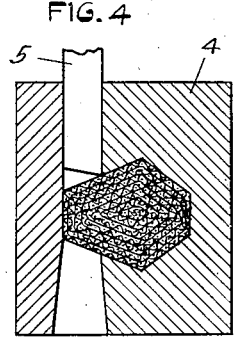
Figure 4 illustrates diagrammatically the method of severing teeth from the lower portion of the belt to permit it to bend more readily over short center drives and small pulleys.
Figure 8:
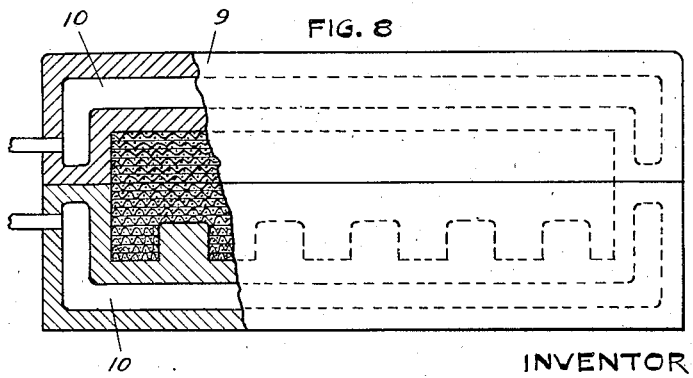
Figure 8 shows the vulcanizing mold partially in section with the belt partially in section.

In Figure 3, for instance, the mold halves 2 and 3 are so arranged that upon molding the belt raw stock shown in Figure 1, the layers will be arranged substantially in the vertical. This results in a belt that is laterally flexible but resists bending. If desired, in order to provide for a belt that is thus stiffened that will still pass over small pulleys, teeth may be formed in the underside of the belt by placing the belt in the supporting holder 4 and shearing portions therefrom to form teeth by the knife 5. The result is shown in Figures 5 and 6 where teeth 6 are formed on the lower side of the belt.

Furthermore, a large portion of rigid material is provided above the corner 7 on the belt as at 8 which gives the belt such a construction that it will resist torsional twist and resist rolling over in the pulleys which action reduces its driving capacity or causes the belt to roll out of the pulleys.

After molding the belt or molding it and severing the teeth from it, the belt is placed in a vulcanized mold 9 having steam chambers 10 and vulcanized.

Referring to Figure 9 and Figure 10, it is sometimes necessary in providing a very accurate belt to bring the belt to size by employing a mold such as the mold halves 11 and 12 or the mold halves 13 and 14.

When the mold halves 13 and 14 are utilized, the lower portion of the belt is arranged with the layers of fabric material substantially vertical while the upper layers as at 15 are substantially horizontal, or at least arch-shaped to prevent and resist longitudinal compression.

This belt may then be laid in the larger mold 16 which has the cover 17 and, when compressed to shape, it will have two groups of layers 18 and 19 arranged horizontally transversely of the belt to resist the twisting and rocking of the belt and its rolling.

In the form shown in Figure 14 two circular members such as 1 may be superimposed on one another as at 20 and 21 and brought to shape in the mold, thus giving a rigid transverse structure that will prevent torsional twist while at the same time permitting a reasonable degree of flexibility.

By providing a substantial portion of the belt above the corner 7, it is possible to secure great structural strength of the belt with the maximum driving power.

Fig. 15 is a typical illustration of how the belt will be mounted when used as part of generator drives on railway cars where the generator is fixed beneath the car body and the truck is pivoted to the car body; for instance, such as illustrated by patent to Wilson 1,502,080 of Jan. 22, 1924.

The term V-pulley turning on a swivel axis in the claims is intended to mean where said pulley and its mounting move either by a swivel movement or by a movement such as would be obtained when the pulley is mounted on a truck pivoted to a car body as referred to in this specification.

It will be understood that I desire to comprehend within my invention such modifications as may be clearly embraced within my claims and the scope of my invention.

Having thus fully described my invention, what I claim as new and desire to secure by Letters Patent, is:

1. In a belt drive, the combination of a V-pulley turning on a fixed axis, a V-pulley turning on a swiveling axis, a V-type belt connecting the two pulleys and having side driving surfaces, and a superstructure above the side driving surfaces, said belt comprising a spirally wound layer of fabric impregnated with rubber, said spiral winding imparting to the belt resistance to torsional twist and preventing rolling of said belt when the pulleys move relatively to each other.

2. In a belt drive, the combination of a V-pulley turning on a fixed axis, a V-pulley turning on a swiveling axis, a V-type belt connecting the two pulleys and having side driving surfaces, and a superstructure above the side driving surfaces, said belt comprising a spirally wound layer of fabric impregnated with rubber, the lower edge of said belt having portions cut away to form teeth, said spiral winding imparting to the belt resistance to torsional twist and preventing rolling of said belt when the pulleys move relatively to each other.

3. In a belt drive, the combination of a V-pulley turning on a fixed axis, a V-pulley turning on a swiveling axis, a V-type belt connecting the two pulleys and having side driving surfaces, and a superstructure above the side driving surfaces, said belt comprising a spirally wound layer of fabric impregnated with rubber, said layer having parts arranged substantially vertically and forming an acute angle in transverse vertical section at the base of the belt, said spiral winding imparting to the belt resistance to torsional twist and preventing rolling of said belt when the pulleys move relatively to each other.

4. In a belt drive, the combination of a V-pulley turning on a fixed axis, a V-pulley turning on a swiveling axis, a V-type belt connecting the two pulleys and having side driving surfaces, and a superstructure above the side driving surfaces, said belt comprising a spirally wound layer of fabric impregnated with rubber, said belt being molded to form side driving surfaces said superstructure comprising an angled portion located above said driving surfaces, said spiral winding imparting to the belt resistance to torsional twist and preventing rolling of said belt when the pulleys move relatively to each other.

5. In a belt drive, the combination of a V-pulley turning on a fixed axis, a V-pulley turning on a swiveling axis, a V-type belt connecting the two pulleys and having side driving surfaces, and a superstructure above the side driving surfaces, said belt comprising a spirally wound layer of fabric impregnated with rubber, said superstructure comprising an arc-shaped portion located above said side driving surfaces, said spiral winding imparting to the belt resistance to torsional twist and preventing rolling of said belt when the pulleys move relatively to each other.

6. In a belt drive, the combination of a V-pulley turning on a fixed axis, a V-pulley turning on a swiveling axis, a V-type belt connecting the two pulleys and having side driving surfaces, and a superstructure above the side driving surfaces, said belt being of hexagonal cross section and comprising a spirally wound layer of fabric impregnated with rubber, the lower edge of said belt having portions cut away to form teeth, said spiral winding imparting to the belt resistance to torsional twist and preventing rolling of said belt when the pulleys move relatively to each other.

ABRAHAM L. FREEDLANDER.